UNITED STATES PATENT OFFICE.

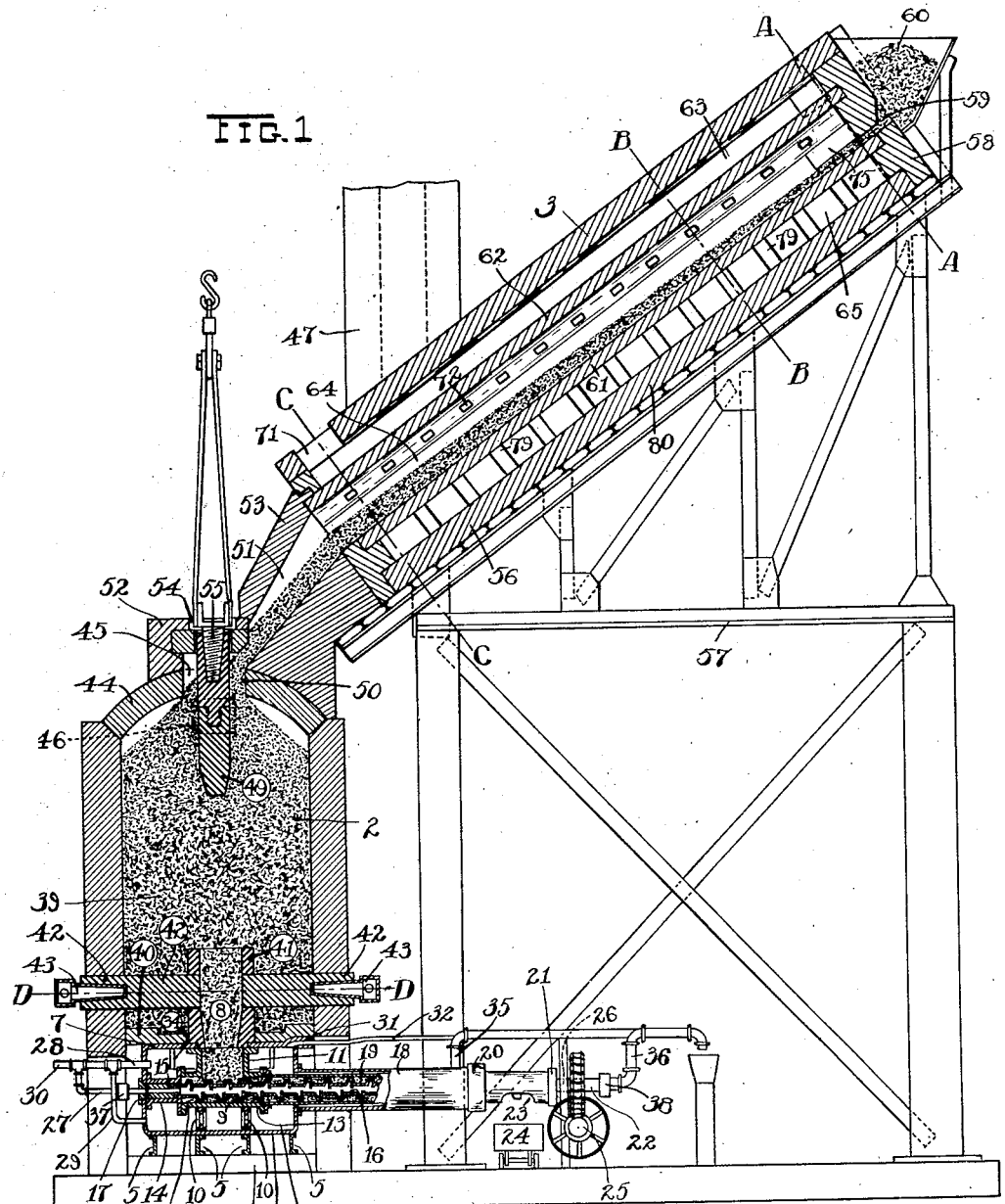

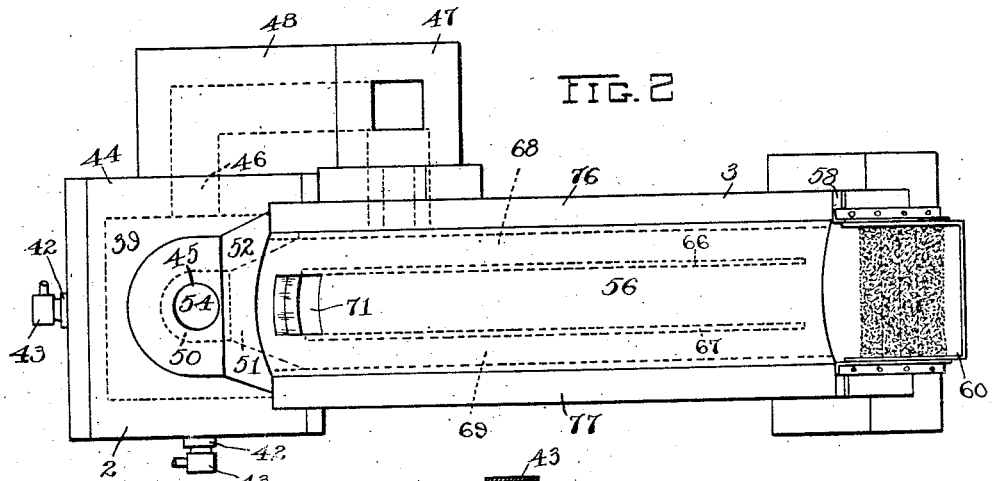
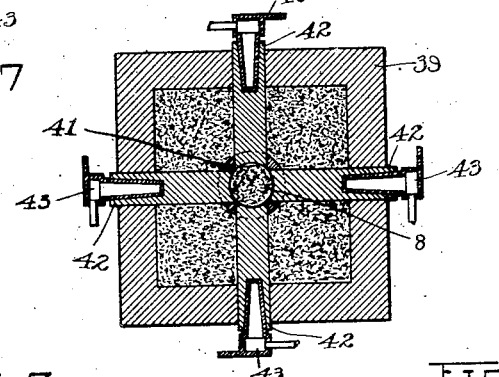
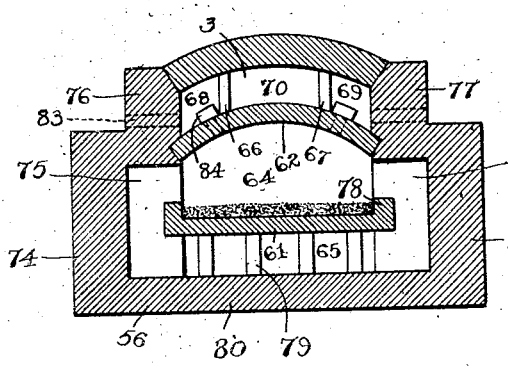
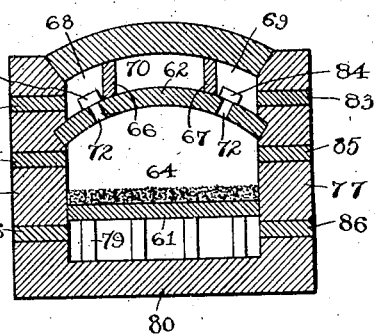

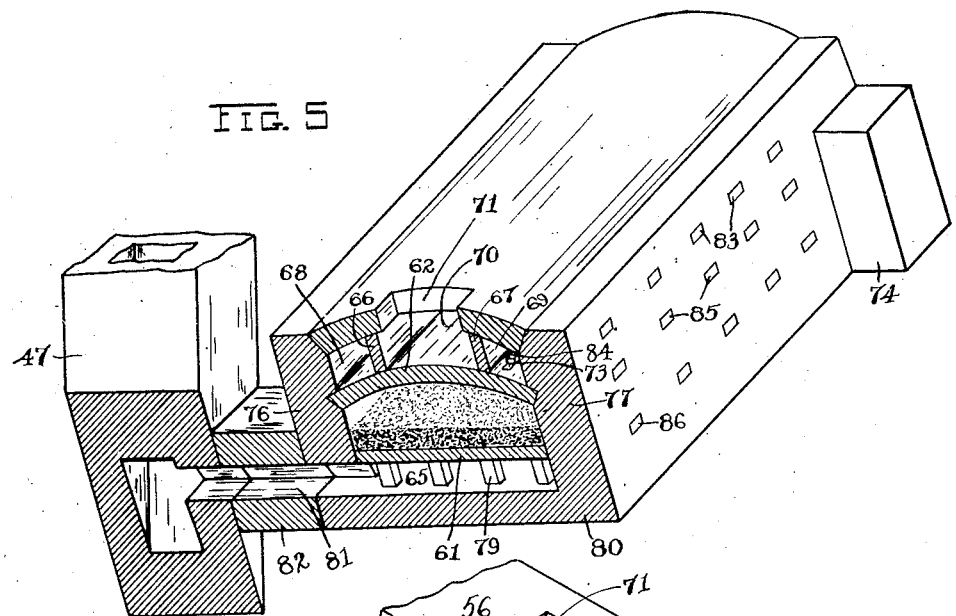
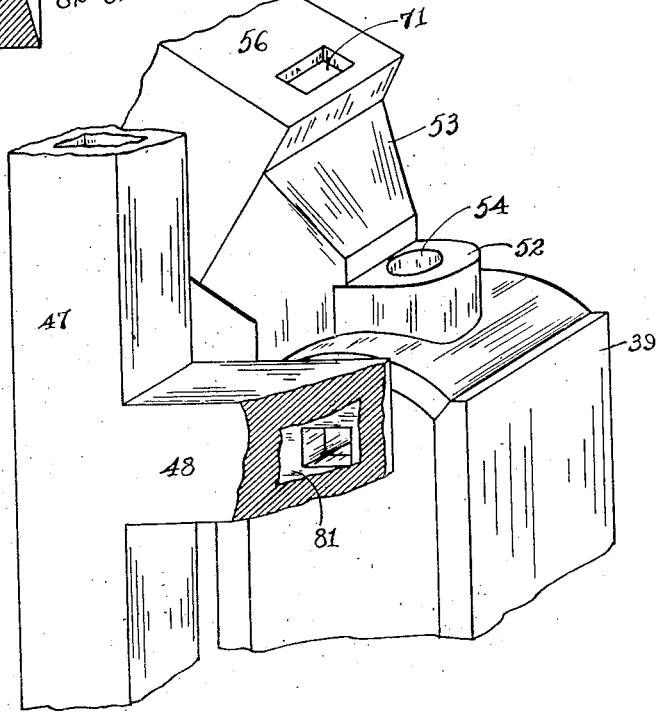

WILLIAM R. CLYMER, OF LAKEWOOD, OHIO, ASSIGNOR TO NATIONAL CARBON COMPANY, A CORPORATION OF NEW JERSEY.

CALCINING-FURNACE.

1,223,475.　　　Specification of Letters Patent.　　Patented Apr. 24, 1917.

Application filed October 16, 1915. Serial No. 56,229.

*To all whom it may concern:*

Be it known that I, WILLIAM R. CLYMER, a citizen of the United States, residing at Lakewood, in the county of Cuyahoga and State of Ohio, have invented a certain new and useful Improvement in Calcining-Furnaces, of which the following is a full, clear, and exact description.

This invention relates to an arrangement for heating carbonaceous materials, such as granulated coal, petroleum coke, etc., to high temperatures.

To render such material suitable for use in the manufacture of carbon articles, such as electrodes, battery carbons and brushes, it is desirable to heat the raw material to temperatures varying between 1300° and 2000° C. At these temperatures the volatile matter is expelled and the specific resistance of the carbon is lowered. Various kinds of gas or electrically heated furnaces are used for this purpose, but in all cases the amount of energy required for heating the material to the desired temperature is very large and the cost is consequently high.

One object of my invention is to provide an arrangement for continuously and uniformly heating the materials to a high temperature.

A further object of my invention is to preheat the material by burning practically all the volatile material contained therein without consuming any appreciable amount of the carbon itself.

Other objects will appear in the appended description, reference being had to the drawings in which:—

Figure 1 is a cross section through the center of the entire apparatus.

Fig. 2 is a top view.

Fig. 3 is a cross section on the line A—A of Fig. 1.

Fig. 4 is a cross section on the line B—B of Fig. 1.

Fig. 5 is a perspective view of portions of the calciner and flue which lie to the right of the line C—C of Fig. 1.

Fig. 6 is a perspective view with certain parts broken away, and is taken from the flue side of the apparatus.

Fig. 7 is a cross section on the line D—D of Fig. 1.

My improved furnace may be considered to be made up of three parts, viz., a water cooled conveyer 1, an electric furnace 2, and a preheating chamber 3. Each of these will be described in turn.

The water cooled conveyer consists of a water-tight casing 4 resting upon supporting channels 5 which rest on a foundation 6. The top 7 of the casing has a central opening in alinement with an outlet 8 of the electric furnace. A large T pipe connection 9 placed within the casing is supported therein in an inverted position by means of suitable spiders 10 resting on the bottom of the casing. The flange of the projection 11 of the T is adjacent the opening in the top of the casing and fastened thereto in a suitable manner to make a water-tight joint. Openings are also provided at each end of the casing 4 in alinement with the openings in the two horizontal projections 12, 13 of the T. The opening in the casing and the adjacent projection 12 are joined by means of a short length of flanged pipe 14. Within the flanged pipe 14 is placed a hollow journal 15 to which a hollow conveyer screw 16 is attached. A thrust bearing 17 is fitted into the opening in the end of the casing adjacent the bearing 15. To the other opening of the casing a jacket 18 is attached which surrounds the conveyer casing 19 attached to the flange of the projection 13. The jacket member 18 is closed by a cap 20 having an opening through which the casing 19 passes.

The conveyer casing 19 incloses the conveyer screw 16 and is closed by a cap 21 having an opening for the projecting end 22 of the conveyer screw. An opening 23 is provided in the portion of the casing 19 between the caps 20 and 21 through which material is discharged into a truck 24 placed thereunder when the conveyer screw is rotated by suitable means, such as the worm drive 25. The second bearing 26 for the rotating screw is located at the projecting end 22.

The water connections consist of a number of inlet pipes, one of which, 27, feeds water through the bearings 15 and 17 into the interior of the hollow screw 16. Other inlet pipes 28 and 29 feed water into the casing at the top and bottom respectively. All of these inlet pipes may be tapped from the same line 30. To insure proper cooling of the base of the furnace, the upper projection of the T 9, and the top of the casing, water is removed through an outlet 31 in the top of the casing through a pipe 32 placed at a higher level than the top 7 of the casing. Annular shaped fins 34 are provided on the casing top to promote proper circulation. The greater bulk of the water admitted to the casing through pipes 28 and 29, however, flows around the conveyer casing 19 and escapes through the outlet pipe 35. The water passing through the journal 15 into the conveyer screw 16 is removed at the other end 22 through an outlet 36. Inasmuch as the conveyer screw 17 is a rotatable member, inlet 27 and outlet 36 will be provided with suitable stuffing boxes 37, 38 respectively.

The electric furnace as shown consists of a square shaft 39 suitably supported on a foundation so that its bottom 40 assumes such a position that the outlet 8 is directly above the projection 11 of the inverted T 9 of the conveyer. The brick bottom is supported by the water cooled base previously described. The lower electrode assembly consists of a carbon or graphite well 41, the lower opening of which constitutes the outlet 8 of the furnace. Current is fed to the well by means of four radially projecting electrodes 42 joined thereto. The well 41 and the projecting electrodes 42 are preferably not made integral, the inner end of the radial electrodes being fitted into openings in the well or otherwise fastened thereto. The outer ends of the electrodes have recesses for inserting therein a metallic water cooled connection 43 as the electrodes would otherwise become very hot due to the heavy currents transmitted through them.

The upper end of the furnace is closed by an arched top 44 having an opening 45 in the center thereof for admitting the charge continuously to the electric heating chamber. An outlet 46 is provided in one of the side walls near the arched top for removing gaseous products to stack 47 by way of the connecting flue 48, as best shown in Fig. 6. An upper electrode 49 extends through the opening 45 in the arch and an inclined chute 51 feeds the charge into the electric furnace through an annular space 50 between the electrode 49 and the opening 45, as described later. As shown, the chute 51, which rests upon the inclosing walls and arched top 44 of the electric furnace, has an opening at the upper end that is somewhat larger than the lower opening.

Suitable brickwork 52, 53 caps over the arched top so that the top of the electric furnace is entirely closed except for an opening 54 through which passes the upper electrode 49. The projecting end of the electrode is water cooled by a terminal 55 placed in a recess in the same manner as described with reference to the electrodes 42.

The opening in the upper end of the spout or chute 51 is connected to a preheating chamber 3 consisting of inclosing walls 56 supported in an inclined position by means of suitable structural work 57. The upper end 58 is elevated just enough above the other end to cause material fed into an opening 59 from the hopper 60 to slide through the chamber 3 into the chute 51. To produce this result with petroleum coke sliding on a brick surface, the inclination should be at an angle of approximately 37°.

Two longitudinal partitions 61 and 62 divide the preheater into three compartments comprising an upper air preheating chamber 63, a combustion chamber 64 and a lower chamber 65. The chamber 63 is further divided by means of two vertical longitudinal walls 66 and 67 to produce two additional passages 68 and 69, one on each side of the central passage 70, as shown in Fig. 4. An opening 71 near the lower end of the preheater, as shown in Figs. 1 and 5, admits air to the passage 70 and the upper end of this passage communicates with the side passages 68 and 69, as shown in dotted lines in Fig. 2. An arched roof 62 separates the combustion chamber 64 from the three upper chambers, and has two longitudinal rows of openings 72 by means of which the side passages 68 and 69 of the air preheating arrangement communicate with the combustion chamber.

Two brick flues 74 having passages 75 therein connect the combustion chamber 64 with lower chamber 65 at the upper end, as shown in Figs. 3 and 5. The portions of the lower longitudinal partition 61 adjacent the passages 75 have upwardly projecting edges 78 (Fig. 3) to keep the sliding charge in its proper place.

The floor 61 of the combustion chamber 64 is preferably supported by a number of bricks 79 which rest on the bottom 80 of the calciner. At the lower end of the chamber 65, gaseous products are carried from the chamber 64 to the stack 47 (Fig. 5) through an opening 81 into the connecting lead 82.

Three rows of removable bricks are provided in both of the side walls 76 and 77. The upper row 83 is for the purpose of inserting tongs or other means for changing the position of bricks 84 to control the draft by varying the size of the openings 72 (Figs. 4 and 5). The second row 85 and bottom row 86 are peep-holes for observing conditions in the intermediate and lower chambers.

The converging chute 51 which feeds material into the top of the electric furnace is inclined at a greater angle than the slope of the calciner to insure a steady flow of material.

In starting the furnace for continuous operation, material will first be fed into the hopper 60 until the preheater and electric furnace are filled to the extent indicated in Fig. 1. At this height no more material will be removed from the hopper until some of the charge is removed at the base of the furnace. The heating is then commenced by blowing in a mixture of air and oil or gas, and burning the mixture until the charge in the preheater has been heated to a certain extent.

When combustion has been started in this manner the conveyer screw will be rotated to cause a continuous passage of material through the entire apparatus. Since the original charge has not been properly heated, it will again be fed into the furnace or otherwise disposed of. As soon as the preheated charge reaches the electric heating region the electric current is turned on and the material is heated up to the desired temperature.

In passing through the combustion chamber 64 the material is admitted in a layer about three inches thick and by a suitable slope of the partition 61 this is caused to increase to about six inches at the bottom. By observing the movement through the peep-holes 85 it has been noted that the charge slides somewhat intermittently on practically a straight front across the entire width of the combustion chamber, so that all particles require the same time to pass through the calciner and all parts are uniformly heated.

The air for burning the gases given off from the charge is admitted to the passageway 70 through the lower opening 71 and as the chamber 70 is directly above the combustion chamber the air becomes preheated upon reaching the end of the passage 70 where it divides and is admitted to the combustion chamber 64 through the holes 72 distributed throughout the length of the passages 68 and 69. The amount of air which enters will be varied by controlling the openings by means of the bricks 84, so that just enough air enters to burn a sufficient quantity of the volatile material to secure the desired temperature without consuming the fixed carbon of the charge. The combustion of the volatile matter preheats the charge in the combustion chamber 64, as well as the air above the partition 62. The burnt gases rise to the upper end 58 of the preheater and pass through the flues 75 to the lower chamber where they heat the bottom surface of the charge through the partition 61 and are then removed by the draft through the opening 81 to the stack 47. In this manner the volatile material which it is desired to eliminate is removed and utilized for uniformly preheating the carbon.

At the temperature reached in the preheating chamber the properties of the calcined material are suitable for various carbon articles and if desired it could be used directly without further treatment in the electric furnace.

In general however, I prefer to pass the material into an electric furnace such as the one described. In this the material received in the heated condition may be heated up as much higher as desired by passing the necessary current between the electrodes 41 and 49.

When material heated up to 2000° C. (3600° F.) is passed through the opening 8, an extraordinary cooling arrangement is required if the material is to be removed continuously in appreciable quantity. In the present instance this is done by means of the hollow water cooled conveyer previously described. The arrangement described for passing water through the interior of the screw 16 and around the pipe 19 and T 9, cools the material so rapidly that when it is dumped into the truck 24 it is cool enough to handle. The intensely heated material is cooled so quickly by this means that none of the conveyer parts are injured although the temperature of 2000° C. is far above the melting point of iron. It is also essential to maintain water in contact with the top 7 of the casing because this is exposed to an exceedingly high temperature since it is in contact with the bottom of the furnace. By withdrawing water through the pipe 32 which is above the level of the top of the casing, continual water cooling throughout is assured.

In prior types of electric furnaces the cost of heating material, such as petroleum coke for instance, is high, as the current must heat the material from room temperature to, say 2000° C. In my improved furnace the material is delivered to the electrical part at a temperature of 1000° to 1200° C., so that about ½ the current is therefore necessary. This is due to the arrangement whereby the gases from the coke itself are utilized to preheat the material to a high temperature.

The quality of the material treated by the improved furnace is especially good due to the very uniform heating of the charge.

The output of the furnace is large (1000 to 2000 lbs. per hour) as a charge is continuously passing therethrough at a much faster rate than in prior types of continuous furnaces. This in itself is an economical feature as a prolonged treatment of the material necessarily means high radiation losses in the heating region.

My arrangement is also useful for calcining carbonaceous materials to lower temperatures in which the electric heating may be omitted and the calciner will feed the treated material directly to the water cooled conveyer. In such arrangements the screw conveyer would remove material from the bottom of the calciner whereby it would be caused to slide down the slanting surface.

The water cooled conveyer *per se* is not my invention and is claimed in a copending application of J. C. Gillette.

Having described my invention, what I claim is:—

1. In an electric heating apparatus, a water cooled conveyer, an electric furnace for heating and feeding material into the conveyer, a passage inclined slightly greater than the angle of friction of the material thereon, said passage being adapted to permit material to slide slowly into the top of the electric furnace, and means for heating the charge as it slides therethrough.

2. In heating apparatus, a water cooled conveyer, an electric furnace to feed heated material into the conveyer, an inclined feeding passage secured to the top of the electric furnace, an air chamber above the feeding passage connected therewith, and a second chamber beneath said passage and connecting therewith at one end.

3. In heating apparatus, an electric furnace, an inclined preheating chamber connected to said furnace consisting of a passageway inclined slightly greater than the angle of friction of the material thereon, an air chamber above said passageway and parallel therewith, having one end opening to the atmosphere and the other end connected to the passageway, and a second chamber beneath said passageway having one end connected therewith and the other end with the atmosphere.

4. In an electric furnace, an inclined chamber for passing therethrough a charge containing combustible volatile matter, an air preheating chamber thereover having openings for admitting air to the charge, an outlet for the gaseous products, a shaft at the base of said first mentioned chamber, a passageway for the charge therebetween, and means for introducing electric heat into the material in the shaft, comprising an electrode in the base of the passage and an electrode in the base of the shaft.

5. In an electric furnace, inclosing walls having an opening for admitting air thereto, an inclined surface for sliding a combustible charge thereon, a partition above the surface having openings for admitting air to the charge, an outlet for gaseous products, a chamber at the base of said surface, means for passing the charge from the inclined surface into the chamber, and means for introducing electric heat into the material in said chamber.

6. In an electric furnace, a passageway for sliding a charge therethrough, said passageway being inclined slightly greater than the angle of friction of the charge thereon, means for preheating the charge as it slides therethrough, a shaft at the base of said passageway having an opening in the top, connected with the base of the passage, an electrode projecting through the opening, a well in the base of said shaft, means for introducing electric heat into the charge between the well and the electrode, and means for removing material at the base of the well.

7. In an electric furnace, inclosing walls having an opening for admitting air thereto, a passageway for sliding a combustible charge therethrough having openings for admitting air to the charge, a shaft at the base of said passageway having an opening in the top, an electrode projecting through the opening, an electrode at the base of the shaft, a screw conveyer for removing the charge, and means for admitting water to cool the conveyer and the charge therein.

8. In an electric furnace, a chamber for sliding a combustible charge therethrough, a shaft at the base of the chamber having an opening, a chute connecting said opening with the base of the charge containing chamber, an electrode projecting through said opening, a tubular electrode at the base of the shaft, means for removing the material at the base of the tubular electrode, and means for removing gaseous products from the shaft and the chamber.

9. In an electric furnace, a chamber for sliding a combustible charge therethrough, an air preheating chamber thereover having openings for admitting preheated air to the charge, a chamber beneath the charge, a shaft at the base of said charge containing chamber having an opening near the top, a passageway for connecting the opening with the base of the charge containing chamber, and means for introducing electric heat into the material in said shaft.

10. In heating apparatus, an inclined passageway, a chamber above the passageway having one end connected with the atmosphere and the other with the passageway, a second chamber beneath the passageway and connected therewith at one end, and a smoke stack connected to the other end of the second passageway.

11. In heating apparatus, an inclined passageway adapted to permit material to be fed therethrough, an air preheating chamber above the passageway consisting of three parallel flues, one of said flues opening at one end into the atmosphere and communicating at the other end with the other two of said flues, and a plurality of openings connecting the said two flues with the passageway, a second chamber beneath the inclined passageway and connected therewith at one end, and a smoke stack connected with the remaining end of the second chamber.

In testimony whereof, I hereunto affix my signature.

WILLIAM R. CLYMER.